United States Patent [19]

Murphy et al.

[11] 4,399,911

[45] Aug. 23, 1983

[54] CARTRIDGE FOR USE IN ANCHOR BOLTING

[75] Inventors: John M. Murphy, Mansfield; Robert H. Spensley, Swanwick; John Ellis, Sutton in Ashfield, all of England

[73] Assignee: Societe Anonyme d'Explosifs et de Produits Chimiques, Paris, France

[21] Appl. No.: 277,345

[22] Filed: Jun. 25, 1981

[30] Foreign Application Priority Data

Jul. 23, 1980 [GB] United Kingdom ............... 8024030

[51] Int. Cl.³ ............................................. B65D 25/08
[52] U.S. Cl. ................................... 206/219; 206/0.5; 206/568
[58] Field of Search .......................... 206/0.5, 219, 569

[56] References Cited

U.S. PATENT DOCUMENTS 3,359,361 12/1967 Oakman ............................. 206/219
3,717,303 2/1973 Daeninckx et al. .................. 206/0.5
4,218,843 8/1980 Clarke, Jr. ............................ 206/0.5

*Primary Examiner*—Joseph Man-Fu Moy

*Attorney, Agent, or Firm*—Wood, Dalton, Phillips, Mason & Rowe

[57] ABSTRACT

An anchoring cartridge suitable for use in anchoring a reinforcing or fixing element such as an anchor bolt in a borehole in a substrate contains a particulate liquid-settable solid component, such as a hydraulic cement, within a frangible liquid-impermeable casing. Through the solid component passes a discontinuous tube at least one end of which is located at one end of the cartridge so as to be in communication with the exterior. To activate the cartridge, it is placed within an activating liquid, such as water, which flows into the cartridge via the discontinuous tube and thus into contact with the solid component from within the cartridge over substantially its whole length, so that after a relatively short time, i.e. a few minutes, the activated cartridge can be positioned for use in a borehole. This discontinuous tube regulates the flow of activating liquid into the solid component and serves to ensure the formation of a self-setting grouting composition of substantially uniform strength when the cartridge is used in anchor bolting.

6 Claims, 7 Drawing Figures

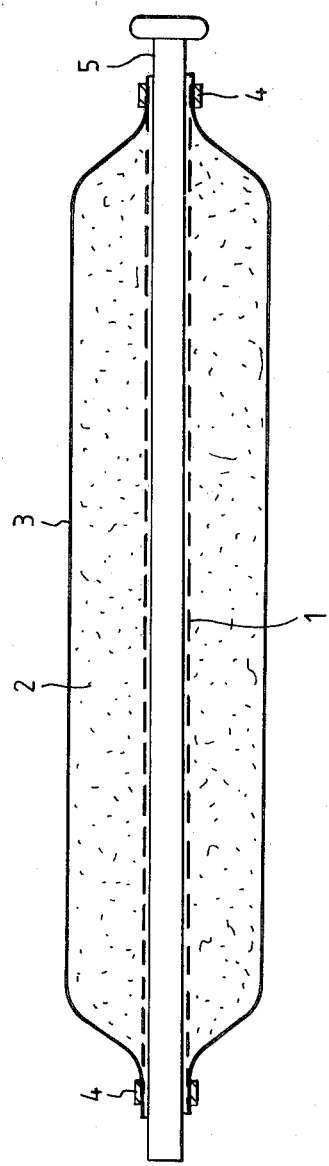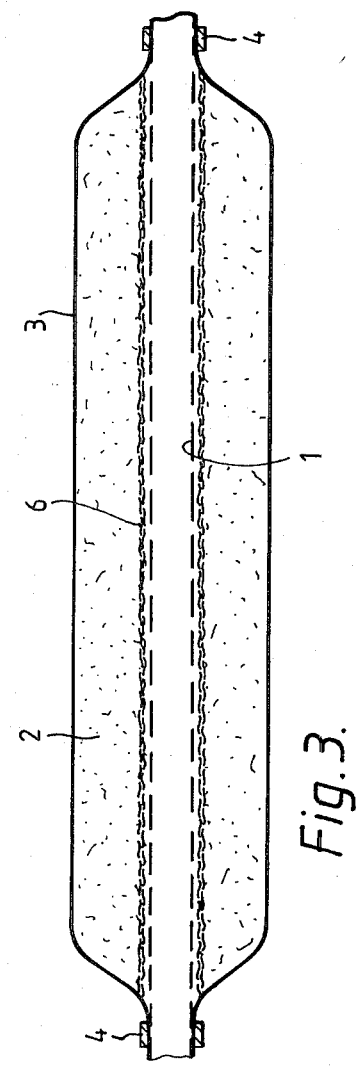

U.S. Patent Aug. 23, 1983 4,399,911
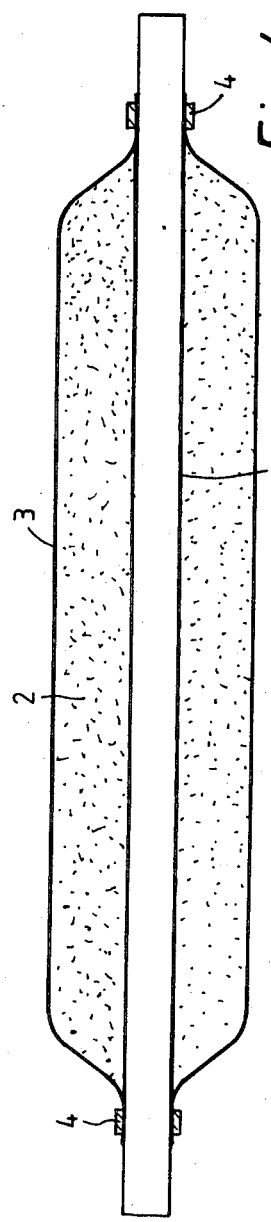
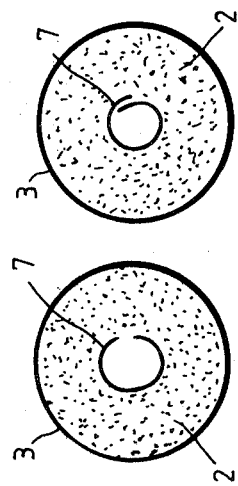
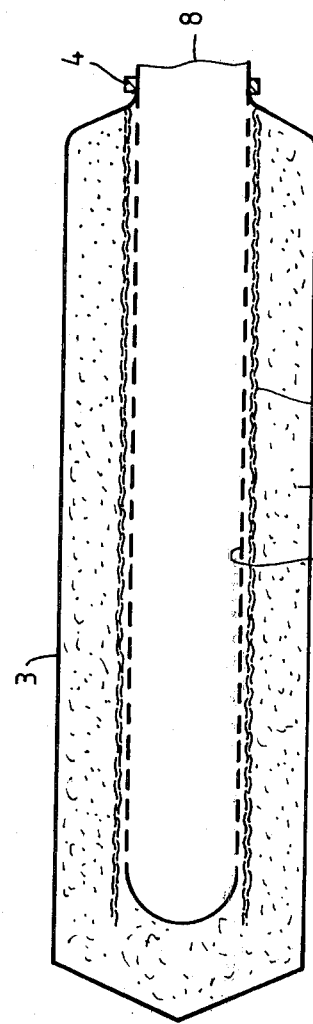

CARTRIDGE FOR USE IN ANCHOR BOLTING

This invention relates to the anchoring of reinforcing or fixing elements such as anchor bolts in a borehole drilled in a substrate such as an underground mine roof, and is concerned with an anchoring cartridge containing a liquid-settable solid component, which in use in brought into contact with an activating liquid component capable of reacting therewith to form a self-setting grouting composition.

Two principal non-mechanical methods of anchoring a reinforcing element in a borehole in a substrate have been utilised, one based on hydraulic cement systems and the other on hardenable synthetic resin systems, generally an unsaturated polyester resin system. Both systems have been employed as cartridged systems, in which the reactive components of the system are both packaged in a frangible cartridge, generally in separate compartments, and the cartridge is introduced into the borehole and then broken and the contents mixed in situ by means of a rotating reinforcing element to form a self-setting grouting composition around the reinforcing element.

Cartridges containing unsaturated polyester resin systems exhibit high flammability and toxicity and hence their use in confined areas such as coal mines gives rise to an unacceptable risk which has recently become of increasing concern and which has therefore given rise to increased interest in the use of cartridged hydraulic cement systems, additionally because of the increasing cost of polyester resins resulting from higher oil prices.

French patent specification No. 2202548 (which corresponds to German Offenlegungsschrift 2350298) describes a cartridge in which a rapidly setting dry hydraulic cement mortar is packaged in a porous paper tube. When required for use, the paper tube is immersed in water for a time sufficient to allow water to penetrate through the tube and hydrate the dry mortar and the moistened tube is then inserted into the borehole prior to insertion of the reinforcing element. This cartridge has disadvantages, the major one being that the porous tube becomes weakened after immersion in water and hence is difficult to handle when wet particularly if the cartridge is longer than about 200 mm.

A similar immersion-activated cartridge is described in British patent specification No. 2004965A, the cartridge casing consisting of a liquid-permeable paper or a perforated plastics film material, but also having a rigidifying member, for example a rigid but brittle plastics netting, which serves to make the moistened cartridge more manageable.

Cartridges such as those described in the aforementioned prior specifications, i.e. cartridges which must be activated by immersion in water prior to insertion in a borehole, suffer from a number of disadvantages, for instance when the cartridge casing is formed from a perforated plastics film, a proportion of the hydratable power tends to escape from the casing so that the cartridges are unpleasant to handle. Similarly, after immersion a proportion of the wetted mortar tends to seep from the casing so that again handling is unpleasant.

It is an object of the present invention to provide an anchoring cartridge based on a liquid-activated solid component which mitigates the disadvantages possessed by the cartridges described above.

According to the invention, there is provided an anchoring cartridge for use in anchoring a reinforcing or fixing element in a borehole in a substrate, the cartridge comprising a frangible liquid-impermeable casing containing a particulate liquid-settable solid component through which passes a longitudinally extending discontinuous tube having at least one open end portion thereof located at one end of the cartridge so as to be in communication with the exterior, whereby when the cartridge, or at least said one end of the cartridge, is immersed in an activating liquid component capable of reacting with the solid component so as to cause it to set, the liquid is caused to enter the discontinuous tube within the cartridge and to come into contact with the solid component over substantially its whole length within the casing.

Advantageously the discontinuous tube extends over the whole length of the cartridge so as to have both open ends thereof located respectively at the ends of the cartridge and in communication with the exterior, since this arrangement will generally ensure more rapid and effective contact between the activating liquid component and the particulate solid component within the cartridge.

The longitudinally extending discontinuous tube will normally be axially disposed within the cartridge.

The discontinuous tube, which will normally be axially disposed in the cartridge, may be provided with a plurality of perforations or slits preferably substantially uniformly positioned over and along the tube. If the perforations or slits are relatively large, means may be employed to minimise loss of the particulate solid component into the discontinuous tube. For example, a removable continuous tube or rod can be close fitted into the discontinuous tube and retained there until immediately prior to use. Alternatively, the discontinuous tube may be surrounded by an absorbent layer, for example a tube of woven or non-woven paper or fibrous material, which prevents passage of particulate solid component into the discontinuous tube but allows passage of activating liquid into the body of the cartridge when the cartridge is immersed for activation.

In one embodiment of the invention, the discontinuous tube is formed from a sheet of material folded on itself into a cylinder with the longitudinal edges of the sheet overlapped so as to form a longitudinally extending slit therebetween.

The discontinuous tube may be in the form of a spirally wound tube having a continuous or semi-continuous helical slit.

The discontinuous tube may be formed from plastics material, metal, cardboard, stiff paper or composite laminates of paper, metal or plastics. Rigid materials unaffected by immersion in water are preferred in order to confer rigidity on the activated cartridge and hence facilitate insertion into a borehole. Preferred materials are also relatively brittle so that they may be easily broken up by the subsequent action of bolt insertion, which may take place with or without rotation.

The frangible casing of the cartridge can be made from any material which is not permeable to, or readily attacked by the contents of the cartridge and which will rupture under the force of stemming the cartridge in a borehole or of inserting an anchor bolt through the cartridge. To facilitate the latter operation, relatively weak materials are preferred for use as the cartridge casing. Examples of these are tubular thermoplastics film, e.g. polyester, polyethylene, polyamide, polyvinyl chloride or polyvinylidene chloride film, laminate film, e.g. thermoplastics/thermoplastics or thermoplastics/cellulose laminates, waterproofed paper/cloth laminates, metal foil and laminates of metal foil with plastics or paper sheeting. These materials are flexible and allow the cartridge to be manipulated so as to aid mixing of the activating liquid with the solid component. However, certain rigid materials may alternatively be used as the outer casing or part of it. Such rigidity can assist in placing of the intra-mixed cartridge in the hole. Examples of suitable rigid casing materials are tubular polystyrene or modified polystyrene, polymethyl methacrylate, waterproofed cardboard, wood and glass.

The particulate liquid-settable solid component, which in the context of the present invention means a non-fluid component, i.e. a component which will not readily flow within the cartridge casing, may be in the form of discrete pellets, granules, tablets or capsules, or in the form of a powder.

The liquid-settable component may be a hydraulic cement, for example a Portland cement, high alumina cement, blast furnace cement, pozzolanic cement or calcium sulphate (gypsum) plaster, either alone or in admixture, in which case the activating liquid component in which the cartridge will be immersed will comprise water. Other modifying inorganic materials, for example lime, anhydrite, fly ash or other pozzolans, may be present in the hydraulic cement component, together with metals or inorganic salts to accelerate or retard the rate of hydration and/or strength development and to promote expansion or minimise shrinkage. Such inorganic additives are well known in the art and include, for example, sulphoaluminates, finely-divided metals such as iron, aluminium and zinc and ammonium, sodium, potassium, lithium, calcium, magnesium, zinc and aluminium salts of inorganic or organic acids.

Other organic materials may be present as plasticisers, or as agents for the control of air entrainment, rheology or setting rate.

Organic polymers may be used to modify the physical characteristics of the hydraulic materials. The polymers may be present in the form of dry powders or granules which may be dissolved or dispersed in the solid component. Such polymers include water-soluble resins, for example urea-formaldehyde or melamine-formaldehyde resins, polyacrylic acids or acrylic esters, or thermoplastic emulsion or suspension polymers.

Besides the particulate self-setting systems based on hydraulic cements, there may be used systems based on other settable inorganic materials, for example a system comprising:

(a) at least one acidic oxyphosphorus compound selected from phosphoric acids, e.g. $H_3PO_4$, anhydrides of phosphoric acid, e.g. $P_2O_5$, and salts of phosphoric acid with multivalent metal cations, e.g. $Al(H_2PO_4)_3$; and (b) a particulate basic component comprising at least one particulate basic compound of a Group II or Group III metal capable of reacting with the oxyphosphorus compound in the presence of water as the activating liquid to form a monolithic solid, e.g. magnesium oxide or hydroxide, magnesium silicate, magnesium aluminate or calcium aluminate. Alternatively only the particulate basic component (b) may be contained in the cartridge casing and an aqueous solution of the oxyphosphorus compound (a) may be used as the activating liquid.

A further example of an inorganic settable composition usable in the cartridge of the invention comprises, in essence, burned magnesite as the solid component and an aqueous solution of magnesium chloride and/or magnesium sulphate as the activating liquid component. Alternatively, a dry powder mixture of burned magnesite and magnesium chloride may comprise the solid component contained in the cartridge casing in which case the activating liquid can comprise water.

The solid component present in the cartridge may contain particulate fillers, for example silica, calcite, limestone, dolomite or granite and/or fibrous fillers, for example asbestos, glass fibre, steel fibre, rock wool, cellulose fibres, shredded paper, or synthetic resin fibres, e.g. polyamide, polyolefin or polyester fibre. The use of a proportion of fibrous filler may assist liquid penetration into the solid component.

BRIEF DESCRIPTION OF THE DRAWING

FIG. 2 shows another embodiment.

FIG. 3 shows another embodiment.

FIG. 4 shows another embodiment.

FIGS. 4a and 4b show the cross-sectional view of FIG. 4.

FIG. 5 shows another embodiment.

Figure 1:
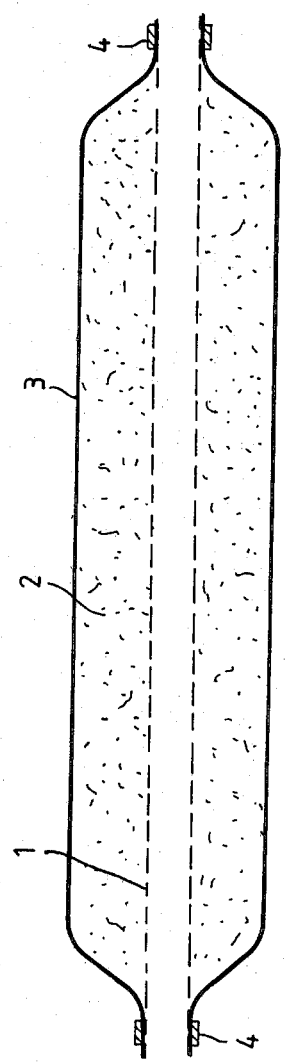
FIG. 1 illustrates a longitudinal section of the anchoring cartridge.

For a better understanding of the invention and to show how the same may be carried into effect, various embodiments thereof will now be described, by way of example, with reference to the accompanying drawings.

FIG. 1 shows a longitudinal section through an anchoring cartridge in which a perforated tube 1 passes axially through a dry particulate solid component 2 contained in a flexible plastics outer casing 3. The outer casing 3 is secured firmly to the perforated tube 1 by means of a suitable clip or tie 4. The ends of the perforated tube 1 are open so that on immersing the cartridge in an activating liquid the tube immediately fills and the liquid can contact the solid component 2 throughout the length of the cartridge by means of the perforations in the tube 1. In the cartridge of FIG. 1 it is necessary to have only small perforations in the tube 1 to prevent loss of the particulate solid component 2 into the tube 1. Such small perforations allow only slow wetting of the dry solid component.

FIG. 2 illustrates an improved embodiment in which the cartridge has a perforated tube 1 with relatively large perforations or slits to allow rapid wetting of the dry solid component 2 with the activating liquid. Loss of dry solid component 2 into the perforated tube 1 is prevented by a close fitting inner rod or tube 5. To activate the cartridge it is immersed in the activating liquid, preferably vertically, and the rod 5 withdrawn to uncover the perforations and allow rapid access of the liquid and venting of the air displaced from the voids in the particulate solid component 2.

FIG. 3 illustrates a further embodiment in which the perforated tube 1 has relatively large perforations which are covered by a tubular layer 6 of absorbent material, e.g. woven or non-woven paper or fibrous material. The absorbent layer 6 prevents passage of the particulate solid component 2 through the perforations but allows rapid contact of the activating liquid when the cartridge is immersed for activation.

The embodiment illustrated in FIG. 4 has an inner tube 7 which is slit longitudinally and protrudes from each end of the cartridge. The slit edges are overlapped as shown in the cross-sectional view of FIG. 4a so that dry particulate solid component 2 is unable to pass into the inner tube 7. To activate the cartridge it is immersed in the activating liquid and the protruding ends of the inner tube 7 are counter-rotated manually. This twisting action opens the longitudinal slit as shown in FIG. 4b and allows rapid contact of the liquid with the dry solid component 2. Spirally wound tubes having a continuous helical slit are particularly suitable for use in cartridges of the type illustrated in FIG. 4.

A further embodiment of the invention is illustrated in FIG. 5 in which a perforated inner tube 1 is open at only one end 8. The tube 1 may be sized to contain the correct volume of activating fluid for the particulate solid component 2 contained in the cartridge. In use the inner tube 1 is filled with activating fluid and the activated cartridge may be immediately placed in the borehole without waiting for full wetting of the dry mixture. Wetting continues to completion in the hole prior to bolt insertion. Delays in the bolting cycle which may otherwise occur with cartridges requiring preactivation are thus overcome or at least minimised. FIG. 5 shows the perforated tube 1 surrounded by a layer of absorbent paper 6 to prevent loss of dry solid component 2 into the tube during storage and transit. The alternative method of preventing loss of solid component 2 illustrated in FIG. 2 may also be employed in cartridges of this type. The closed end of the cartridges may be sealed by conventional techniques such as heat-sealing, clipping, tying or sticking with an adhesive.

The following Examples further illustrate the invention.

EXAMPLE 1

A 40 mm diameter × 300 mm long cartridge consisted of a polyester casing which contained a mixture of 500 g of Crystacal R (a gypsum plaster supplied by British Gypsum) and 5 g of Irgament Mighty (a Category B superplasticiser supplied by Ciba-Geigy). Down the centre of the cartridge ran a 6 mm diameter paper straw, perforated with 0.75 mm diameter holes at 5 mm centres. The cartridge was immersed vertically in water and wetting was completed within 5 minutes, yielding a water/plaster mix ratio of 0.28.

Two such cartridges were placed in a 43 mm diameter × 1000 mm deep borehole which had been drilled in sandstone rock. A 36 mm diameter wooden dowel was then spun into the borehole to a depth of 950 mm while rotating at approximately 400 revolutions per minute, thereby bursting the cartridges, the contents of which formed a grouting composition which filled the annulus between the dowel and the borehole.

The plaster grouting composition set hard within 90 minutes and the anchored wooden dowel was subjected to a tensile test after 6 hours. The dowel failed at a tensile load of 11 tonnes without apparent failure of the set anchoring grout.

EXAMPLE 2

A 35 mm × 700 mm cartridge consisted of an outer polyester casing which contained a mixture of 300 g of rapid hardening Portland cement (supplied by Rugby Portland Cement Co.), 100 g of pulverised fuel ash (supplied by C.E.G.B.), 100 g of "Chelford 50" sand (supplied by British Industrial Sands), 9 g of Melment F10 (a Category A superplasticiser supplied by Hoechst) and 5 g of Cem-FIL AR fibre 12 mm long (an alkali-resistant glass fibre supplied by Pilkington Bros.).

Down the centre of the cartridge was a 6 mm diameter paper straw, perforated with 2 mm diameter holes at 5 mm centres, and covered externally with absorbent tissue paper to prevent loss of the powdered cementitious mix through the holes. When the cartridge was immersed vertically in water the wetting out was completed within 4 minutes yielding a water/cementitious mix ratio of 0.29.

Two such cartridges were firmly packed into a 30 mm diameter × 600 mm deep borehole in a concrete block. A 25 mm galvanised rebar was then driven into the cartridges to a depth of 580 mm. The resulting cementitious grouting composition was allowed to cure for 3 days at 15° C. after which the resulting anchorage was tested, withstanding a pull-out load of 20 tonnes without failure.

We claim:

1. An anchoring cartridge for use in anchoring a reinforcing or fixing element in a borehole in a substrate, the cartridge comprising a frangible liquid-impermeable casing containing a particulate liquid-settable solid component through which passes a longitudinally extending discontinuous tube having at least one open end portion thereof located at one end of the cartridge so as to be in communication with the exterior, whereby when the cartridge, or at least said one end of the cartridge, is immersed in an activating liquid component capable of reacting with the solid component so as to cause it to set, the liquid is caused to enter the discontinuous tube within the cartridge and to come into contact with the solid component over substantially its whole length within the casing.

2. A cartridge as claimed in claim 1, wherein the discontinuous tube extends over the whole length of the cartridge so as to have both open ends thereof located respectively at the ends of the cartridge and in communication with the exterior.

3. A cartridge as claimed in claim 1 or 2, wherein the discontinuous tube is axially disposed within the cartridge.

4. A cartridge as claimed in claim 1 or 2, wherein the discontinuous tube is filled with a removable continuous tube or rod which is adapted to be withdrawn from the discontinuous tube prior to use of the cartridge.

5. A cartridge as claimed in claim 1 or 2, wherein said discontinuous tube is surrounded by a tubular layer of absorbent material which serves to prevent passage of the particulate solid component through the discontinuities in said tube.

6. A cartridge as claimed in claim 1, wherein the particulate liquid-settable solid component is a hydraulic cement.

* * * * *